March 17, 1942. N. ERLAND AF KLEEN 2,276,947
REFRIGERATING APPARATUS
Filed May 9, 1939 5 Sheets-Sheet 1
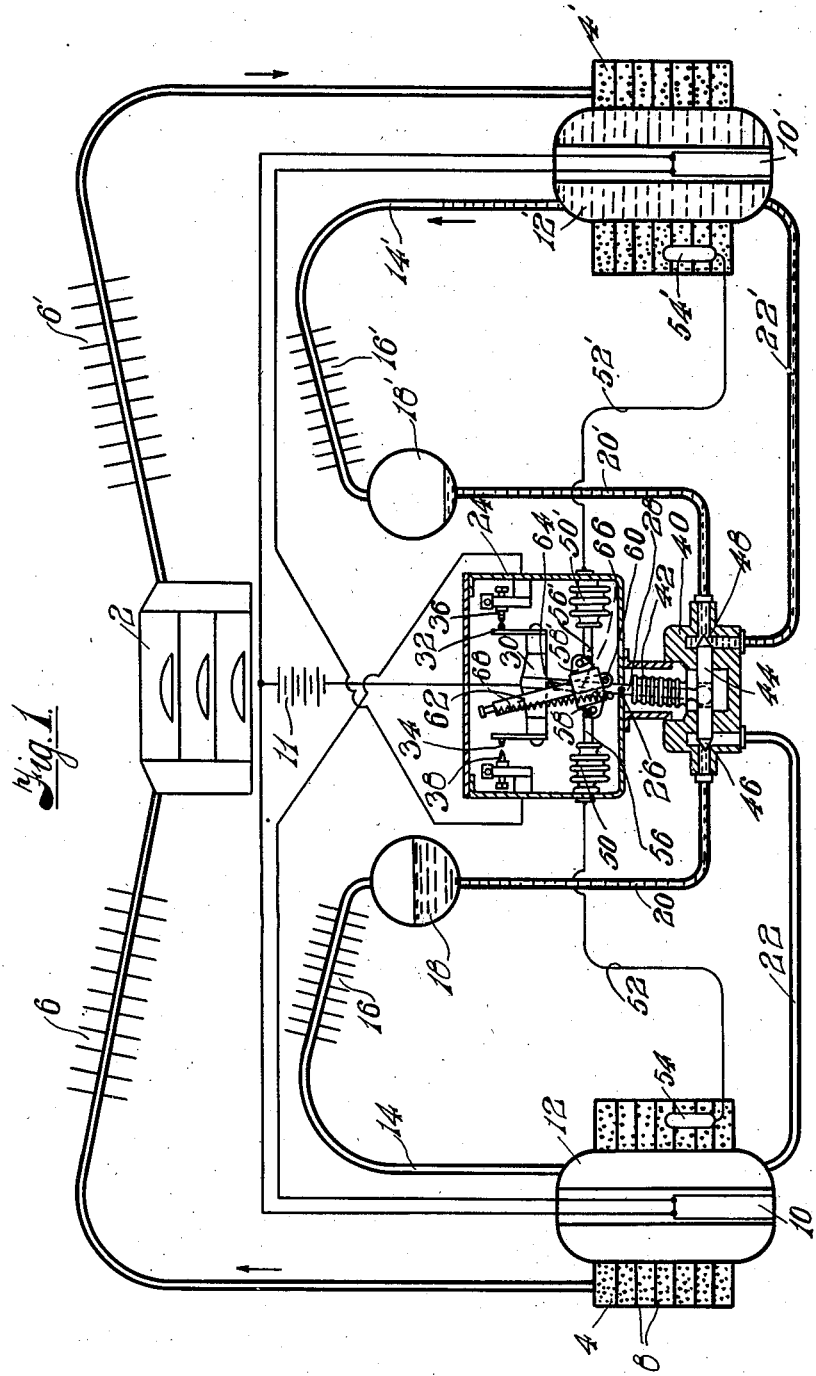
INVENTOR
NILS ERLAND AF KLEEN
BY Norris & Bateman
ATTORNEYS March 17, 1942.    N. ERLAND AF KLEEN    2,276,947
REFRIGERATING APPARATUS
Filed May 9, 1939    5 Sheets-Sheet 2
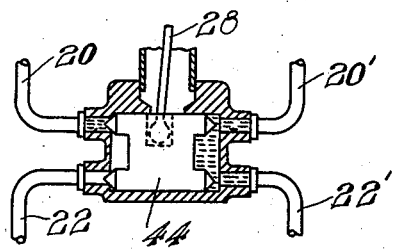
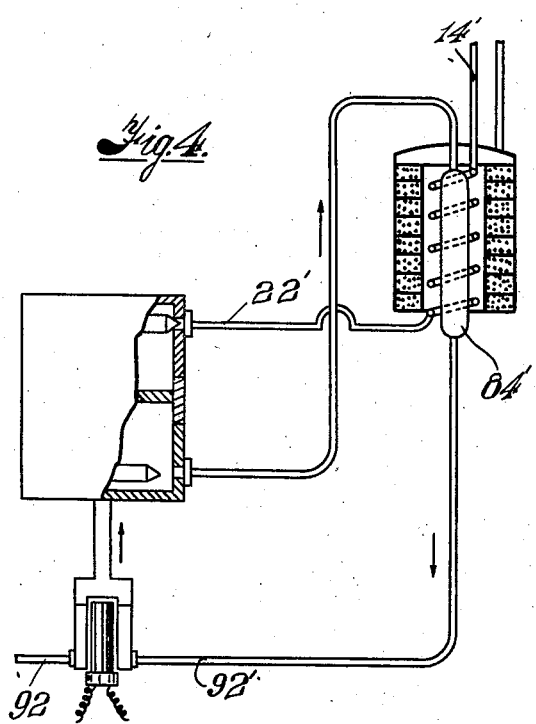
INVENTOR
NILS ERLAND AF KLEEN
BY Norris & Bateman
ATTORNEYS March 17, 1942.  N. ERLAND AF KLEEN  2,276,947
REFRIGERATING APPARATUS
Filed May 9, 1939  5 Sheets-Sheet 3

INVENTOR
NILS ERLAND AF KLEEN
BY
Norris & Bateman
ATTORNEYS

March 17, 1942.  N. ERLAND AF KLEEN  2,276,947
REFRIGERATING APPARATUS
Filed May 9, 1939    5 Sheets-Sheet 4
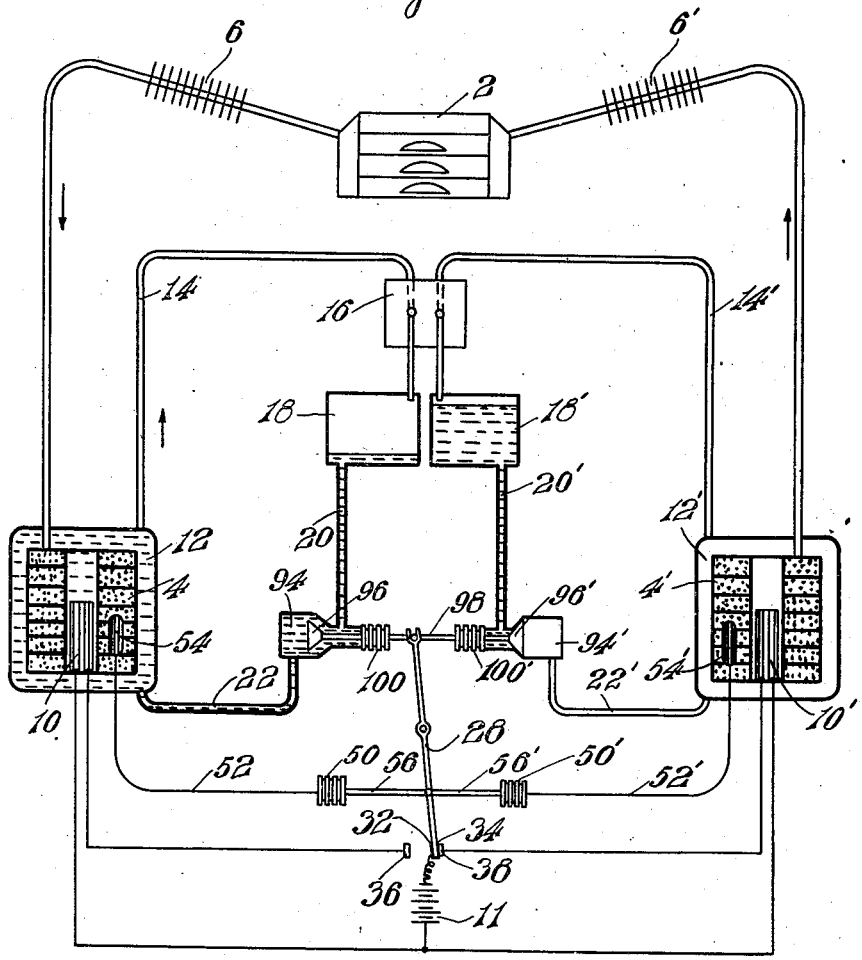
INVENTOR
NILS ERLAND AF KLEEN
BY Norris & Bateman
ATTORNEYS March 17, 1942.  N. ERLAND AF KLEEN  2,276,947
REFRIGERATING APPARATUS
Filed May 9, 1939  5 Sheets-Sheet 5

INVENTOR
NILS ERLAND AF KLEEN

Patented Mar. 17, 1942

2,276,947

UNITED STATES PATENT OFFICE 2,276,947

REFRIGERATING APPARATUS

Nils Erland af Kleen, Stockholm, Sweden

Application May 9, 1939, Serial No. 272,599½
In Sweden October 1, 1938

5 Claims. (Cl. 62—5)

The present invention relates to an absorption or adsorption refrigerating apparatus of the type which consists of two or more intermittently functioning units, each comprising, besides a circulation system for the refrigerating medium (primary system), a circulation system for a secondary medium (secondary system) which is in heat-exchanging relation with the boiler-absorber of the primary system and which cools the boiler-absorber during the absorbing period. In this specification the expressions "absorption" and "absorber" as applied to a unit are to be understood to imply also "adsorption" and "adsorber."

In order, with such an apparatus to bring about a simple transition from generating to absorbing and conversely and a favourable operation of the system as a whole, each secondary system is provided in accordance with the invention with a valve which controls the circulation of the secondary cooling medium and both the said valve and the main heat supply to the boiler-absorber are controlled by a common switching device, the arrangement being such that the said valve is closed when the main heat supply to the boiler is turned on and is open when the said main heat supply is turned off.

Further features characteristic of the invention will become apparent from the following description of two practical forms of construction of apparatus according to the invention shown in the accompanying illustrative and diagrammatic drawings.

In the accompanying drawings:

Figure 1 is a plan view, partly diagrammatic, showing a plurality of intermittently functioning units embodying the invention and showing two separate cooling systems;

Figure 2 is an enlarged view of the common switching device shown in Figure 1, and in the position of shutting off both the inlet from the collector tank and the outlet to the absorber;

Figure 4 shows a modified form of the invention, showing a different form of heat regulation;

Figure 6:
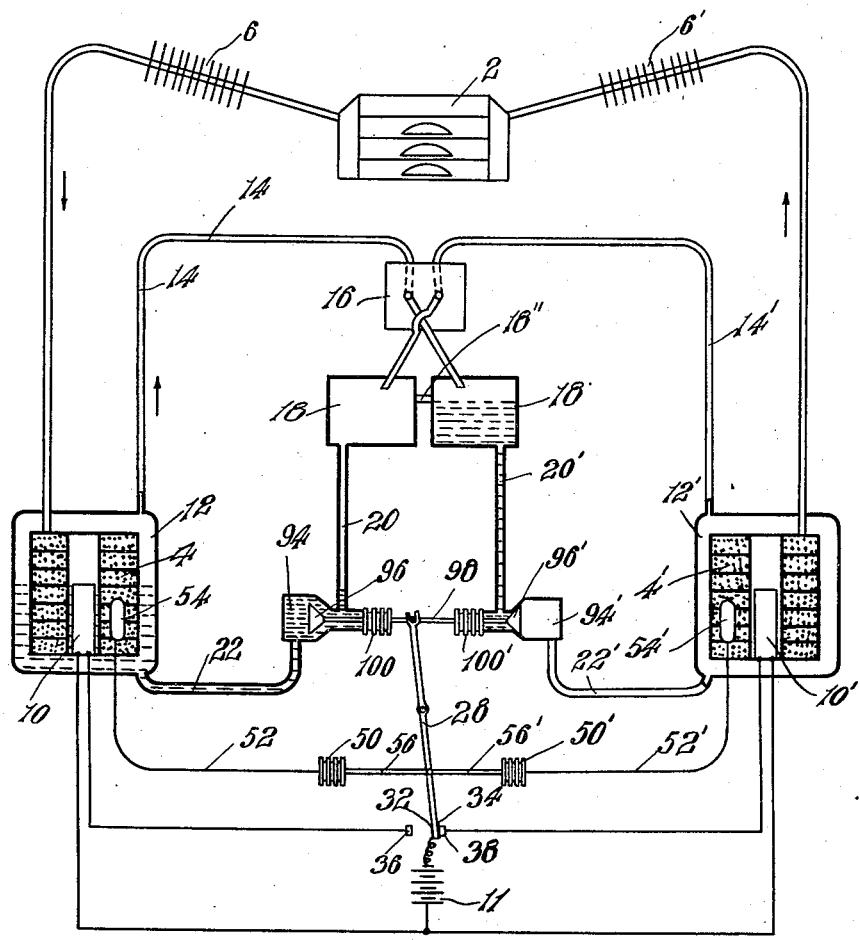

Figure 5 is a plan view in diagrammatic form of another embodiment of the invention, the two secondary cooling systems being joined by one common condenser; and Figure 6 is a plan view, partly in diagrammatic form, which shows an invention of substantially the same embodiment as Figure 5 but with the cooling installations of the secondary cooling system indicated with the condenser in such a manner that both circuits will have the same pressure throughout the working operation.

Similar characters of reference indicate corresponding parts throughout the various views.

The refrigerating apparatus exemplified in Figure 1 consists of two similar units which function intermittently and alternately so as to produce continuous refrigeration in a vessel 2. Each unit comprises a system (primary system) containing a refrigerating medium of its own which system consists of a boiler-absorber 4 or 4', a condenser 6 or 6' and an evaporator fitted in vessel 2. The boiler-absorber comprises troughs 8, charged with a dry salt such as, for example, strontium chloride or any other substance capable of absorbing gases and of expelling them when heated. Inside the boiler-absorber and in efficient heat-exchanging relation therewith is arranged an electric heater 10 or 10' which is connected via a contact system to be described in more detail later, to a current-source 11 which may, for example, be constituted by an ordinary main supply system. In the boiler-absorber 4 there is also arranged a jacket 12 which, together with a flow pipe 14, condenser 16, collector tank 18 and return pipes 20 and 22, form a closed circulation system (secondary system) for the secondary cooling medium. The collector tank is positioned at a higher level than the jacket 12. The same features characterise the boiler-absorber 4' in the other unit. The secondary cooling medium, the function of which is to produce a speedy cooling-down of the boiler-absorber after the refrigerating medium has been expelled therefrom by heat, must have a low boiling point and a high latent heat value.

For the purpose of regulating the functioning periods of the various parts of the apparatus, provision is made, according to the invention, for a common control device located inside the casing 24. This device consists of a rocking mechanism having a snap action and comprising a rocking arm 28 pivoted at 26. One end of this arm carries a bridge 30 that is electrically connected with one pole of the current-source 11 and carries two contacts 32 and 34. In the position shown in the drawings the contact 32 bears against a contact 36 so that the heater 10 is supplied with current. By an anticlockwise rocking movement of the arm 28, however, the contact 32 is separated from the contact 36 and the contact 34 is brought into engagement with the contact 38 so that the heater 10 is disconnected from the current supply and the heater 10' is supplied with current. The arm 28 projects downwards into a valve housing 40, a flexible bellows 42 accommodating the motion of the arm 28 while, at the same time, sealing the opening through which the arm projects into the valve housing 40. The lower end of the arm 28 is of spherical form and projects into an excision in a sliding valve member 44, the conically shaped extremities of which cooperate with seats 46, 48 in the valve housing. In the position shown the connection between the pipes 20 and 22 is closed while the connection between pipes 20' and 22' is open. In the other position of the rocking mechanism these conditions are reversed.

In order positively to avoid any leakage of the cooling medium from the valve, the latter may be of the construction shown in Figure 2 wherein the valve member 44 controls both the entry of the cooling medium into the valve casing from the pipes 20 and 20' and also the escape thereof from the valve casing to the pipes 22 and 22'. This arrangement also shuts off connection between the two secondary systems.

For the purpose of actuating the arm 28, use is made of a thermostat device which consists of the two bellows 50, 50' which are connected by tubes with the phials 54, 54' fitted in the boiler-absorbers. These phials are filled with, for example, a volatile liquid which vaporises when the boiler-absorbers are heated and exerts a pressure on the thrust rods 56, 56' connected with the bellows. These rods are secured by links through the projecting lugs 58, 58' to an arm 62 pivotally mounted at 60. To the arm 28 there is pivotally secured at 64 a further arm 66. A spiral spring 68 is tensioned between the free ends of the arms 62 and 66.

In the position of the parts as shown, the arm 28 has just snapped over into the position shown. The heater 10 is connected to the current source and the unit to the left is thus at the beginning of its generating phase. The unit to the right is in its absorption phase and is engaged in producing cold in vessel 2. The valve 48 is open and the secondary system of the right-hand unit is engaged in cooling down the boiler-absorber 4' by the absorption of heat by evaporation of the cooling medium in the jacket 12'. The vapour generated in the jacket 12' is condensed in the condenser 16' and returned through the tank 18' and return pipes 20' and 22' to the jacket 12'. In proportion as the temperature rises in the boiler 4 and falls in boiler 4', the pressure of the bellows 50 gradually rises and finally overbalances the pressure of the bellows 50, thus causing arm 62 to be deflected to the right. When the arm 66 and spring 68 pass the dead centre position, the arm 62 moves rapidly over into its extreme right position. The spring 68 then causes the arm 28 to move instantaneously over to its opposite extreme position whereby, on the one hand, the heater 10 is disconnected and storer 10' is switched in, while, on the other hand the valve 48 is closed and the valve 46 opened. The cooling medium in tank 18 then flows into the jacket 12 and produces a rapid cooling down of same, with the result that absorption phase of the left hand refrigerating unit commences. In the right-hand unit, on the other hand, the secondary cooling medium is expelled from the jacket 12' by the heat of the heater 10' and is condensed in the condenser 16' and collected in the tank 18', the closed valve 44 preventing the return of this liquid to the jacket 12' so that the latter is soon emptied.

Figure 3:
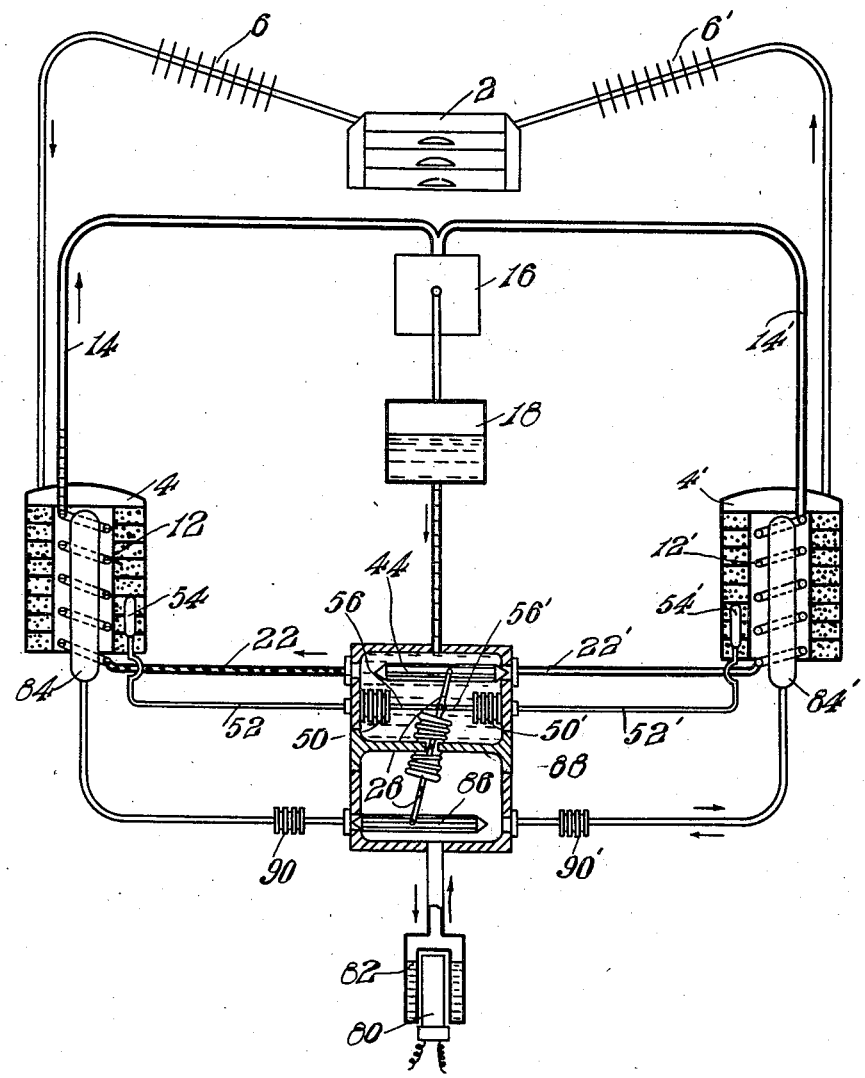
Figure 3 is a plan view, diagrammatically shown, of an alternative form of the invention, with one condenser and one cooling tank in the secondary system in connection with two boiler absorbers, this drawing also showing at the lower side thereof an indirect heating system.

The apparatus diagrammatically illustrated in Figure 3 is similar in its essential details to the apparatus just described and its constitution will be at once obvious from a comparison with Figure 1. The two secondary systems are here, however, coupled in cascade and provided with a common condenser 16 and a common collector tank 18. Instead of a jacket, there is seen here a tubular coil 12, 12' in boiler-absorber 4 or 4' respectively through which the secondary cooling medium flows. The heat supply to the boiler-absorber is here fed indirectly from a common heat source consisting of a steam boiler continuously heated by the heater 80. A liquid of appropriate composition, contained therein, is thereby vapourised and is convected alternately to one or the other of two vessels 84, 84' which are connected with the boilers by efficient heat conducting means. The vessels 84 and 84' are heated by the condensation therein of vapour delivered from the boiler 82. The supply of heat is controlled by a valve member 86 which is operated by a switch arm 28 and which always shuts off the steam supply to that boiler, the secondary system of which is out of operation.

In view of the fact that the two valve systems are integrally constructed, precautions must be taken to prevent heat from being conducted from the common heat source to the boiler absorber which is in its absorption phase. The partition wall 88 in the common valve switch-over system is therefore constructed of heat insulating material while, further, insulating, corrugated tubular members 90, 90' are inserted in the pipes leading to the vessels 84, 84'.

The construction shown in Figure 3 may, for the purposes of the heating system, be modified in the manner exemplified in Figure 4 by providing separate return pipes 92, 92' fitted from between the vessels 84, 84' to the steam boiler 82. The steam (vapour) and the condensate may thereby circulate in a circuit route instead of proceeding, in opposite directions, through one and the same pipe as is the case in Figure 3.

The constructional form exemplified in Figure 3 may also, under certain conditions, be modified so as to possess, as in Figure 1, a separate heat source and a separate secondary system. For its effective performance, the invention is independent of the method whereby the boilers are heated, and this may be effected by electricity, by burners, or, inter alia, by waste gases or the like. Where the common heat source consists of and takes the form of a burner, it may be constructed with freedom to switch-over (oscillate) so as to heat up the one or the other of the boilers alternately.

In Figure 5 there is shown still another form of construction for the cooling apparatus according to the invention. The secondary systems are, in this case, completely separated from each other and separate valves 94, 94' are employed so that leakage from the one system to the other is positively excluded. The valve bodies 96, 96' are actuated by means of a common rod 98 that is sealed in the valve housings by the bellows 100, 100' and which with the aid of an appropriate switch-over rod 28 equipped with snap action, can be shifted from the one extreme position to the other. In spite of the fact that the secondary systems are entirely independent of each other it is possible, as shown, to combine the condensers into a single condenser 16 consisting of two parallel extending pipes having common cooling flanges.

As in the case of Figure 1, the heating is effected electrically. If use is made of the method for indirect heating, as is the case in Figures 3 and 4, it is possible under certain conditions with this indirect heating system also to arrange completely separate valves in the pipes leading to both boilers, which valves are mechanically operated by the switch-rod 28.

The cooling jacket 12 is, in this case, fitted around each separate boiler 4.

The clear space in the secondary system which is not occupied by the cooling medium contains a gas, such as nitrogen that is a poor conductor of heat. During the expelling periods, when the nitrogen gas fills the cooling jacket, the radiation of heat from the boiler is prevented which will, further, increase the efficiency.

Modifications in the constructional forms shown are possible in other directions also. Thus, instead of a mechanical actuation of the valves, they may be actuated indirectly from the change-over system by means of a hydraulic, pneumatic, electric or other transmission functioning with or without retardation. It is possible, also, to dispense with valves at one or several positions and make use of water dams, that is, to stop up the pipes by a column of mercury, or oil or the like. The motive impulses required to change the coupling may be derived, not from a thermostat but from any device that is sensitive to pressure and fitted in any arbitrary position in the apparatus or may be derived from a time-switch.

Figure 6 of the drawings shows an arrangement similar to Figure 5 but embodying an improvement which increases the efficiency of the cooling system as compared with those shown in the preceding figures. In the arrangement shown in Figure 6 the connections between the condenser and the collector tanks 18 and 18' are crossed over so that the pipe 14 leading from the cooling jacket of the boiler-absorber 4 delivers into the collector tank 18' whilst the pipe 14' leading from the cooling jacket of the boiler-absorber 4' delivers into the collector tank 18. In addition the collector tanks 18 and 18' are connected together by means of a pipe 18'' which opens into the collector tanks at points above the level of the bottoms thereof. As the result of this arrangement a proportion of the liquid evaporated in the cooling jacket 12 or 12' of the boiler-absorber 4 or 4' at the beginning of the absorbing period is trapped in the collector tank 18' or 18 of the secondary circuit belonging to the other unit so that only a part of the total liquid available circulates in the secondary system during the later part of the absorbing period.

As shown in Figure 6 of the drawings the boiler-absorber 4 is in the later part of its absorbing period and a continuous circulation of cooling fluid is taking place in the secondary system shown on the left hand side of the drawings by evaporation in the jacket 12, condensation in the condenser 16, overflow from the tank 18' to the tank 18 and return through the pipes 20 and 22 to the cooling jacket.

At the end of the absorbing period of the unit shown on the left hand side, the valve 96 will close and the valve 96' will open so that the whole of the liquid collecting in the tank 18' will be delivered to the jacket 12'. At the same time the liquid remaining in the jacket 12, which will continue to evaporate until that jacket is dry, will also be delivered into the tank 18' whence it will flow into the jacket 12', so that in the initial stage of the cooling period of the boiler-absorber 4' the whole of the cooling liquid available will be delivered to the jacket 12' thus hastening the preliminary cooling of the boiler-absorber 4'. The cooling medium delivered through the pipe 14' and condensed in the condenser 16 will not all be returned to the jacket 12', however, since the tank 18 must be filled to the level of the pipe 18'' before any liquid can return to the jacket 12'. Thus a proportion of the liquid will be trapped in the tank 18 during the initial stages of the absorbing period and will be held out of circulation during the later stages. This is a substantial advantage because the cooling system requires a comparatively large quantity of liquid to effect rapid cooling of the boiler-absorber in the initial stages but operates more efficiently with a comparatively small quantity of liquid in circulation during the later stages when the temperature difference between the boiler-absorber 4' and condenser 16 falls to a comparatively small value.

The particular refrigerating medium which is preferred in the use of the apparatus embodying the present invention is ammonia ($NH_3$) in the primary system, and methylchloride ($CH_3Cl$) in the secondary system. In the place of methylchloride, there can be used butane, pentane or the like.

It is obvious that various changes and modifications may be made in the details of construction and design of the above specifically described embodiments of this invention without departing from the spirit thereof, such changes and modifications being restricted only by the scope of the following claims.

I claim:

1. A refrigerator of the type described, comprising a plurality of intermittently functioning units, each unit including a boiler absorber, a condenser, and an evaporator coupled together to form a primary circuit for a refrigerant, means for supplying heat to the boiler absorber of each unit, a plurality of members forming secondary circuit means for a cooling medium to cool the boiler absorber of each unit, said plurality of members including separate elements in heat exchanging relationship with respective boiler absorbers, condensing means, condensate collecting means, and pipe connections coupling said plurality of members together, said condensate collecting means being arranged at a higher level than said separate elements, valve means for controlling the circulation of the cooling medium to respective units, said valve means being interposed between said condensate collecting means and said separate elements so that a portion of the liquid cooling medium in said secondary circuit means is stored in said collecting means when the circulation of cooling medium to one unit is stopped by the closure of said valve means, and a common switching device controlling the supply of heat to respective boiler absorbers and selectively actuating said valve means to control the circulation of cooling medium to respective units, said switching device being operable to stop the circulation of cooling medium to each unit at the same time as it starts the supply of heat to the boiler absorber of that unit.

2. A refrigerator of the type described, comprising a plurality of intermittently functioning units, each unit including a boiler absorber, a condenser, and an evaporator coupled together to form a primary circuit for a refrigerant, each unit having a secondary cooling system including a cooling vessel in heat exchanging relationship with the boiler absorber, a condenser, a condensate collecting tank, and pipe connections permitting cooling medium to circulate through said secondary system, said condensate collecting tank being arranged at a higher level than said cooling vessel, a control valve located between each of said collector tanks and said cooling vessels so that the liquid cooling medium is stored in one of said collecting tanks when the circulation in the respective secondary cooling system is stopped by the closure of the corresponding control valve, and a common switching device controlling a supply of heat to respective boiler absorbers and controlling also said valves, said switching device being operable to stop the circulation of cooling medium to each unit at the same time as it starts the supply of heat to the boiler absorber of that unit.

3. A refrigerator of the type described, comprising a plurality of intermittently functioning units, each unit including a boiler absorber, a condenser, and an evaporator coupled together to form a primary circuit for a refrigerant, a plurality of members forming secondary circuit means for a cooling medium to cool the boiler absorber of each unit, said plurality of members including separate coils in heat exchanging relationship with respective boiler absorbers, condenser means, a condensate collecting tank, and pipe connections coupling said plurality of members together to permit circulation of said cooling medium, said condensate collecting tank being arranged at a higher level than said coils, valve means for selectively controlling the circulation of the cooling medium to respective units, said valve means being interposed in said pipe connections between said condensate collecting tank and said coils so that a portion of the liquid cooling medium in said secondary circuit means is stored in said collecting tank when the circulation of cooling medium to one unit is stopped by closure of said valve means, and a common switch device controlling the supply of heat to respective boiler absorbers and actuating also said valve means to control circulation of cooling medium to said units, said switching device being operable to stop the circulation of cooling medium to each unit at the same time as it starts the supply of heat to the boiler absorber of that unit.

4. A refrigerator of the type described, comprising a plurality of intermittently functioning units, each unit including a boiler absorber, a condenser, and an evaporator coupled together to form a primary circuit for a refrigerant, a secondary circuit for a cooling medium to cool each unit during the absorbing period, said secondary circuit including a cooling vessel, a condenser, and pipe connections permitting the cooling medium to circulate through said vessel and condenser, a common switching device controlling the supply of heat to respective boiler absorbers and controlling also the circulation of cooling medium in the secondary circuit, said switching device being operable to stop the circulation of cooling medium in the secondary circuit to each unit at the same time as it starts the supply of heat to the boiler absorber of that unit, and means for trapping a portion of the liquid cooling medium circulated in the secondary circuit during the initial part of the absorbing period and for holding this liquid out of circulation during the rest of the absorbing period.

5. A refrigerator of the type described, comprising a plurality of intermittently functioning units, each unit including a boiler absorber, a condenser and an evaporator coupled together to form a primary circuit for a refrigerant, each unit having a secondary cooling system including a cooling element in heat exchanging relationship with the boiler absorber, a condenser, and pipe connections permitting cooling medium to circulate through said cooling element and condenser, a common switching device controlling the supply of heat to respective boiler absorbers and controlling also the circulation of cooling medium in the secondary system, said switching device being operable to stop circulation of cooling medium in the secondary system of each unit at the same time as it starts the supply of heat to the boiler absorber of that unit, and a collector tank associated with each of said secondary cooling systems and having an inlet opening for receiving condensate cooling medium, said collector tank having an overflow opening for delivering a portion of said condensate cooling medium to the cooling element, said collector tank being effective to trap a portion of the cooling medium which circulates in the secondary system during the initial part of the absorbing period of the associated boiler absorber and to hold such trapped medium out of circulation during the remainder of said absorbing period.

NILS ERLAND af KLEEN.